Figure 1:
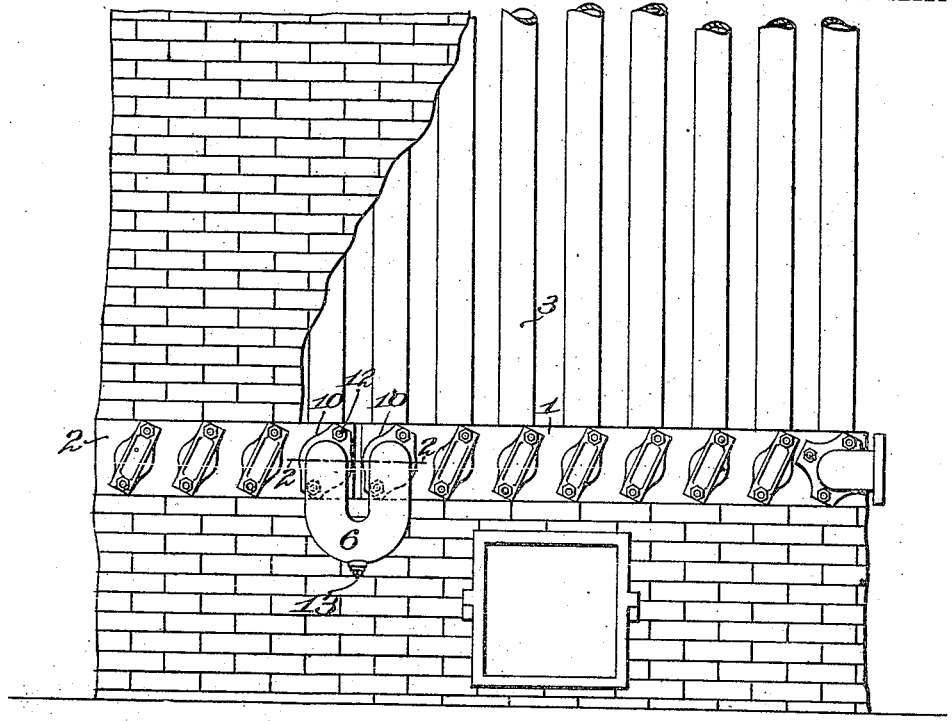

No. 848,234. PATENTED MAR. 26, 1907.
E. B. FREEMAN.
EXPANSION COUPLING.
APPLICATION FILED APR. 12, 1905.

2 SHEETS—SHEET 1.

Witnesses
Edward S. Day
Alfred H. Hildreth

Inventor
Ernest B. Freeman
by his Attorneys
Phillips Van Everen & Fish

No. 848,234. PATENTED MAR. 26, 1907.
E. B. FREEMAN.
EXPANSION COUPLING.
APPLICATION FILED APR. 12, 1905.

2 SHEETS—SHEET 2.

Witnesses
Edward S. Day
Alfred H. Hildreth

Inventor
Ernest B. Freeman
by his Attorneys
Phillips Van Everen & Fish

UNITED STATES PATENT OFFICE.

ERNEST B. FREEMAN, OF DEDHAM, MASSACHUSETTS, ASSIGNOR TO B. F. STURTEVANT COMPANY, OF BOSTON, MASSACHUSETTS, A CORPORATION OF MASSACHUSETTS.

EXPANSION-COUPLING.

No. 848,234.      Specification of Letters Patent.      Patented March 26, 1907.

Application filed April 12, 1905. Serial No. 255,185.

*To all whom it may concern:*

Be it known that I, ERNEST B. FREEMAN, a citizen of the United States, residing at Dedham, in the county of Norfolk and State of Massachusetts, have invented certain new and useful Improvements in Expansion-Couplings; and I do hereby declare the following to be a full, clear, and exact description of the invention, such as will enable others skilled in the art to which it appertains to make and use the same.

The present invention relates to an expansion-coupling particularly designed for use in connection with feed-water heaters or fuel-economizers.

A well-known type of fuel-economizer comprises a series of upper headers, which are in communication with each other at their rear ends, a corresponding series of lower headers, wall-boxes or branch pipes for placing the lower headers in communication with each other at their forward ends, and vertical circulating-tubes connecting the headers. Economizers of this type are made in sections, and the wall-boxes or branch pipes of adjacent sections are separated to allow for contraction and expansion. To place the wall-boxes or branch pipes in communication with each other, expansion-couplings are employed, consisting of curved pipes secured at their ends to the wall-boxes or branch pipes. As heretofore constructed, all portions of these couplings have been located in the same plane, so that the axes of the joint-seats at the ends of the couplings have been located in the same plane with the body portions of the couplings. As a result of this construction the couplings are not allowed to bend freely throughout their entire length, but are subjected to severe strains and are often broken when the wall-boxes or branch pipes move with relation to each other. Also in these couplings it has been necessary heretofore to provide a packing in the form of gaskets in the joints between the ends of the coupling and the wall-boxes or branch pipes. The use of these gaskets is objectionable on account of their rapid deterioration and also on account of the fact that they do not keep the joints tight if provision is made for any relative movement between the ends of the coupling and the wall-boxes or branch pipes.

The object of the present invention is to provide an expansion-coupling which can bend freely without any liability of breaking and by which, if desired, the use of gaskets can be dispensed with.

With this object in view the present invention contemplates the provision in an expansion-coupling consisting of a curved pipe of joint-seats arranged with their axes angularly disposed with relation to the plane of the body portion of the pipe so as to allow a rotary movement of the joint-seats when the pipe is bent. By arranging the joint-seats so as to be capable of a rotary movement when the pipe is bent the ends of the pipe are not rigidly held when the branch pipes or wall-boxes move with relation to each other, and the pipe is allowed to bend freely, so that the strain is distributed evenly throughout the pipe. As the wall-boxes or branch pipes move toward or from each other the only movement imparted to the joint-seats at the end of the coupling with relation to the branch pipes or wall-boxes is a rotary one, and consequently the joint-seats may be tapered, so that the joints between the coupling and the wall-boxes or branch pipes are tapered metal to metal joints, which form of joint does not require the use of gaskets or other packing.

While the invention, broadly considered, contemplates any form of coupling which consists of a curved pipe provided with joint-seats arranged with their axis angularly disposed with relation to the plane of the body portion of the pipe, a substantially U-shaped pipe is preferably employed, the end portions of which are disposed at substantially right angles to the plane of the body portion, as a pipe of this shape is adapted to bend readily and can be easily manufactured.

In the preferred form of the invention hereinafter specifically described the end portions of the U-shaped pipe are provided with tapered joint-seats and with flanges in which are formed elongated slots to receive the bolts by which the pipe is secured to the wall-boxes or branch pipes and to allow the joint-seats to rotate with relation to the seats in the wall-boxes or branch pipes.

The present invention will be clearly understood from an inspection of the accompanying drawings, in which—

Figure 2:
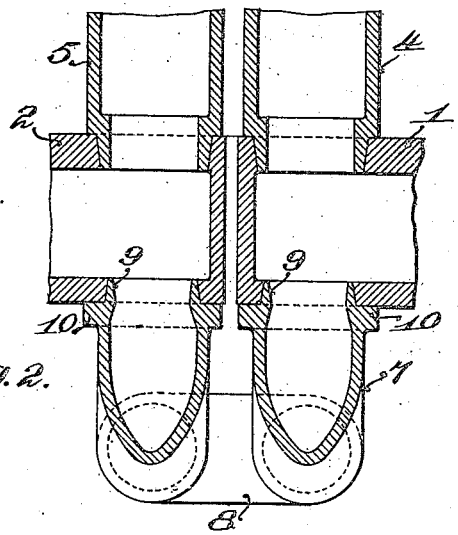
Figure 3:
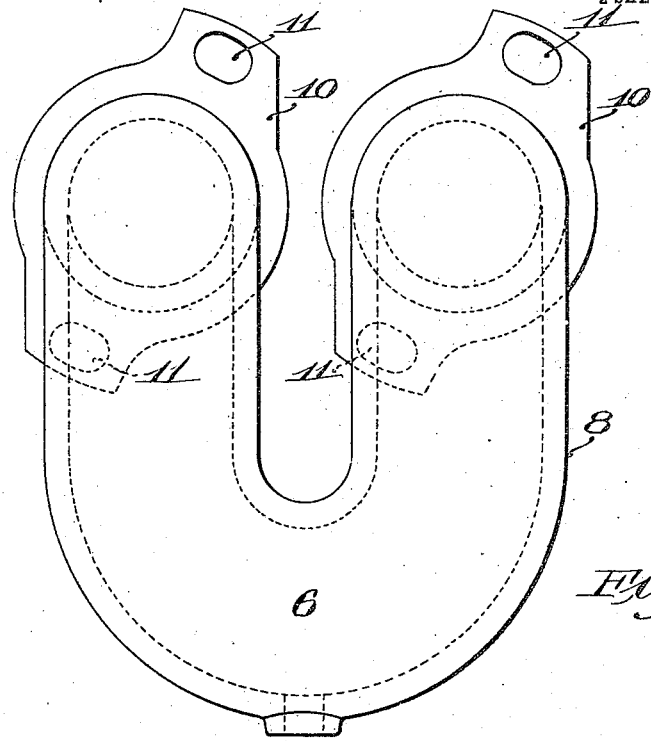
Figure 4:
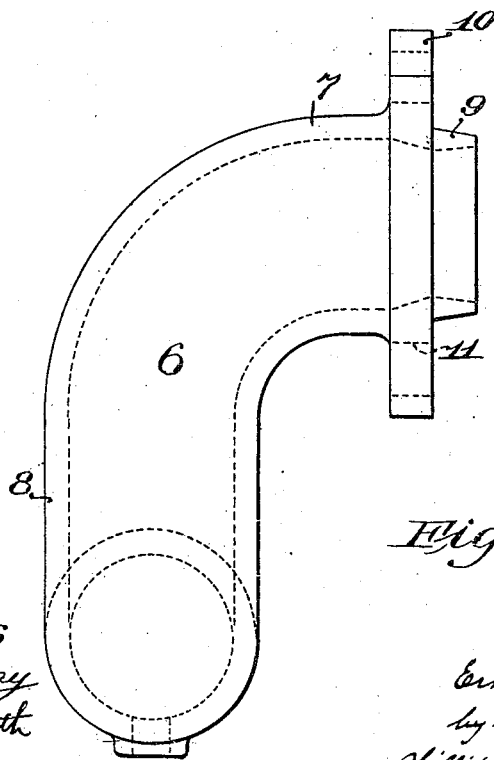

Figure 1 is a view in side elevation of a portion of a well-known type of fuel-economizer provided with an expansion-coupling embodying the present invention in its preferred form. Fig. 2 is a detail sectional plan view, on a somewhat enlarged scale, taken on the line 2 2 of Fig. 1; and Figs. 3 and 4 are detail views, on a still larger scale, in front and side elevation, respectively, of the expansion-coupling.

Referring to the drawings, 1 and 2 indicate two wall-boxes of a fuel-economizer of well-known construction. In Fig. 1 the vertical circulating-tubes are indicated at 3 and in Fig. 2 two of the lower headers are indicated at 4 and 5. The improved expansion-coupling for connecting the two wall-boxes is indicated at 6 and as illustrated consists of a cast-iron pipe curved in the form of the letter U and having its end portions 7 disposed at right angles to the plane of its body portion 8. The ends of the expansion-coupling are provided with tapered joint-seats, (indicated at 9,) which are received in tapered sockets or joint-seats in the sides of the wall-boxes 1 and 2, as is clearly illustrated in Fig. 2. The ends of the expansion-coupling are also provided with flanges 10, in which are formed at diametrically opposite points elongated arc-shaped slots 11, through which securing-bolts 12 pass and hold the joint-seats of the coupling firmly against the joint-seats of the wall-boxes. It will be evident from an inspection of the drawings that the axes of the joint-seats at the ends of the expansion-coupling are arranged at right angles to the plane of the body portion of the coupling. When the wall-boxes 1 and 2 move toward or from each other, the only movement with relation to the wall-boxes which the bending of the body portion of the coupling tends to impart to the joint-seats is a rotary movement. The elongated slots in the flanges at the ends of the coupling allow the joint-seats of the coupling to rotate in the joint-seats of the wall boxes, and thus the ends of the coupling are not rigidly held, as in couplings which have been heretofore used, and the body portion of the pipe is allowed to bend freely, the strain on the pipe being distributed evenly thoughout its entire length.

In the form of expansion-coupling illustrated in the drawings the body portion of the coupling extends downwardly from the end portions. When the body portion of the coupling is thus arranged, it forms a trap in which sediment may collect, and in order to allow this sediment to be readily removed an opening is formed at its lowest point, which is closed by a removable plug 13.

In expansion-couplings as heretofore constructed the curved portion of the coupling has been arranged in a horizontal plane. In addition to the advantages hereinbefore set forth a coupling constructed in accordance with the present invention has the additional advantage that the curved body portion of the coupling can be arranged in a vertical plane, so that a greater obstruction is offered to the passage of the water directly from one wall-box to the other and the liability of the water passing from the inlet to the outlet pipe without circulating properly through the vertical tubes is lessened.

The nature and scope of the present invention having been indicated and a preferred form of the invention having been specifically described, what is claimed is—

1. An expansion-coupling consisting of a pipe having a curved body portion and provided with joint-seats constructed to rotatably engage the parts to be coupled and arranged with their axes at substantially right angles to the plane of the body portion of the pipe, whereby a rotary movement of said joint-seats is permitted when the pipe is bent in the plane of its body portion.

2. An expansion-coupling consisting of a pipe having a curved body portion and provided with joint-seats constructed to rotatably engage the parts to be coupled, and arranged with their axes angularly disposed with relation to the plane of the body portion of the pipe, whereby a rotary movement of said joint-seats is permitted when the pipe is bent in the plane of its body portion.

3. An expansion-coupling consisting of a pipe having a curved body portion and end portions angularly disposed with relation to the plane of the body portion, provided with joint-seats constructed to rotatably engage the parts to be coupled, whereby a rotary movement of said joint-seats is permitted when the pipe is bent in the plane of its body portion.

4. An expansion-coupling consisting of a substantially U-shaped pipe having its end portions disposed at substantially right angles to the plane of its body portion.

5. An expansion-coupling consisting of a pipe having a curved body portion, end portions angularly disposed with relation to the plane of the body portion, and tapered joint-seats on said end portions.

6. An expansion-coupling consisting of a pipe having a curved body portion, end portions angularly disposed with relation to the plane of the body portion, and flanges on said end portions provided with elongated slots to receive securing-bolts.

7. An expansion-coupling consisting of a substantially U-shaped pipe having its end portions disposed at substantially right angles to the plane of its body portion, tapered joint-seats on said end portions, and flanges on said end portions provided with elongated slots to receive securing-bolts.

In testimony whereof I affix my signature in presence of two witnesses.

ERNEST B. FREEMAN.

Witnesses:
FRED O. FISH,
HORACE VAN EVEREN.